March 19, 1968  3,373,973
HANS-JOACHIM SCHMIDT HOLTHAUSEN
MIXING APPARATUS FOR BLENDING BULK MATERIAL
Filed April 13, 1967  2 Sheets-Sheet 1
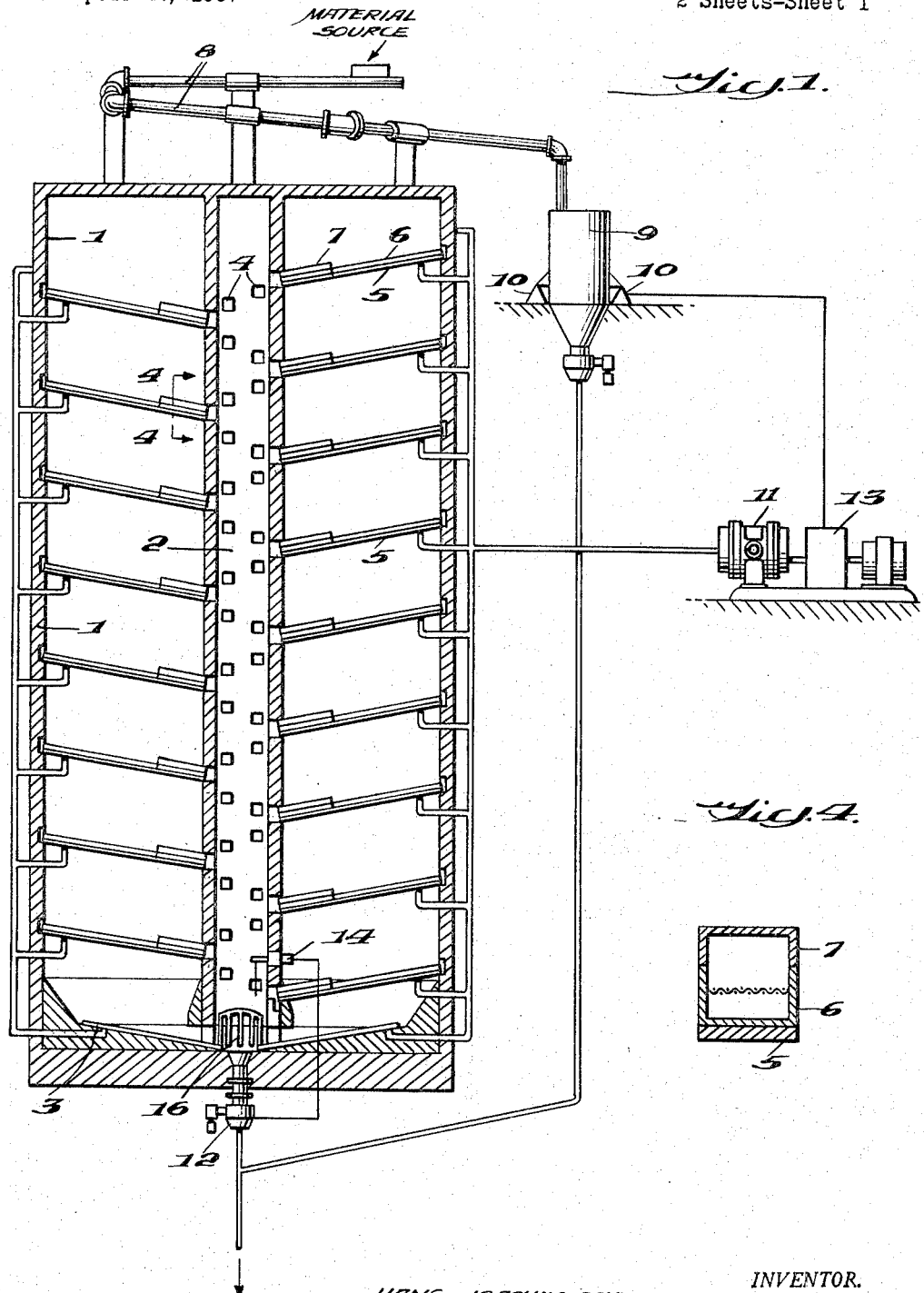
INVENTOR.
HANS-JOACHIM SCHMIDT-HOLTHAUSEN,
BY
ATTORNEYS March 19, 1968
HANS-JOACHIM SCHMIDT HOLTHAUSEN
3,373,973
MIXING APPARATUS FOR BLENDING BULK MATERIAL
Filed April 13, 1967
2 Sheets-Sheet 2
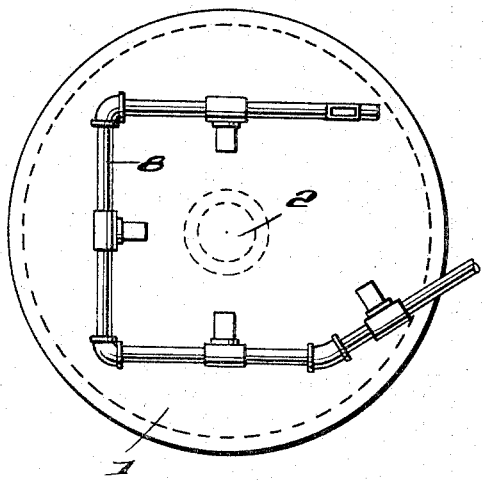
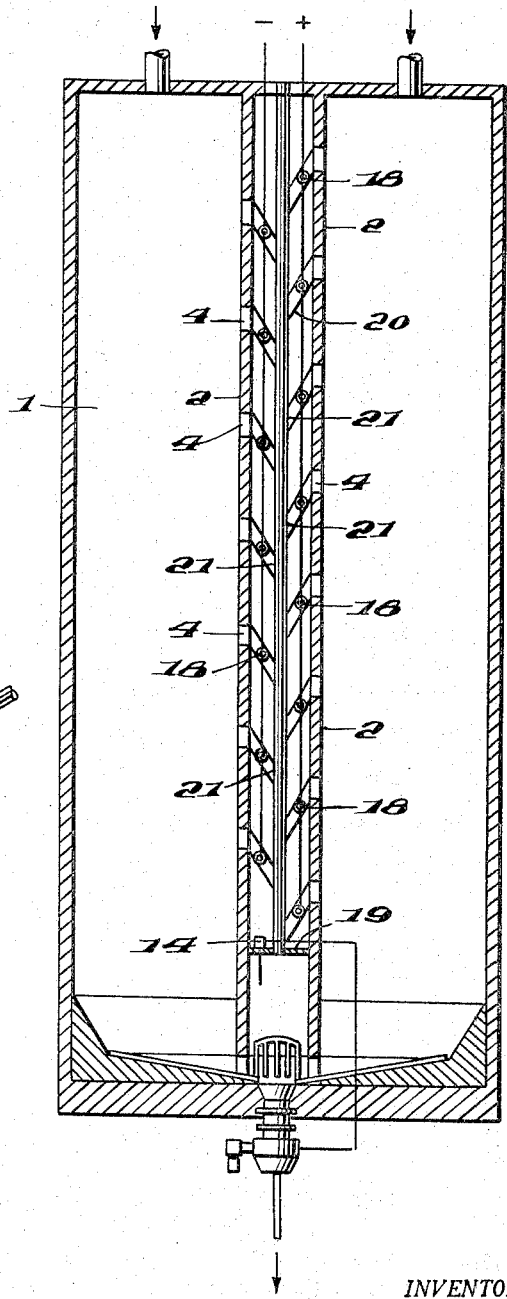
INVENTOR.
HANS-JOACHIM SCHMIDT-HOLTHAUSEN,
BY
ATTORNEYS

United States Patent Office 3,373,973
Patented Mar. 19, 1968

3,373,973
MIXING APPARATUS FOR BLENDING BULK MATERIAL
Hans-Joachim Schmidt-Holthausen, Hamburg-Sasel, Germany, assignor to Fuller Company, Catasauqua, Pa., a corporation of Delaware
Filed Apr. 13, 1967, Ser. No. 630,600
Claims priority, application Germany, Apr. 16, 1966, P 39,218
13 Claims. (Cl. 259—4)

ABSTRACT OF THE DISCLOSURE

A mixing silo for blending dry bulk material having a vertically disposed mixing chamber arranged within the silo. The mixing chamber carries a plurality of material inlets at various levels for receiving material which is thereby blended in the mixing chamber and discharged by gravity through the outlet in the bottom of the silo.

Background of the invention

Various types of pneumatic mixing devices are in use for mixing dry (finely grained to powdery) bulk materials. Mixing devices based on statistical reasoning have also been used.

For example, methods are known in which a large number of silos is filled either simultaneously or successively, and also emptied either simultaneously or successively. A known statistical blending formula is as follows:

$$S_o = \frac{S_a}{\sqrt{n}}$$

wherein,
$S_a$=deviation from the standard of the materials fed into the silos relative to a certain factor characterizing the material (for instance, in homogenizing raw cement mix, the calcium-carbonate content is here preferably used),
$S_o$=deviation from the standard of the mixed material,
$n$=a number of mixing phases.

It is evident from the formula that for a certain $S_o$ value and an $S_a$ value predetermined by the raw material, the statistical mixing quality can be influenced only by the "$n$" value.

Therefore, it is necessary to make "$n$," i.e. the number of mixing phases, as great as possible. To date, this necessity has limits, imposed by the economy of the method, because an additional single silo, or at least a silo cell, must be provided per mixing phase, at a considerable cost.

In addition to the importance of a large number of mixing phases, the time of intermixing between the first and the last phase is also important for the quality of the mixture.

For example, continuously operated pneumatic homogenizing silos should have at least a capacity corresponding to an outlet of 10–12 raw milling hours' feed rate. This is to be accomplished so that the temporarily occurring fluctuations can be averaged statistically over as great a time span as possible.

Summary of the invention

This invention is primarily characterized in that in a silo, particularly in the silo center, a material mixing chamber with any number of material inlets at various levels is provided to supply partial flows of material from the silo into the mixing chamber, which partial flows combine therein, on the basis of the number and the various height levels of the material inlets, to form a homogeneous total material flow before the material leaves the silo.

In further development of the invention, the total quantity of material discharging from the silo is made to match the various partial material flows flowing into the mixing chamber from the individual material inlets disposed at various silo levels by means of a regulating device.

Since the quantities of material flowing into the mixing device are not always uniform, an overflow vessel is provided which serves to control the material quantities. The values found thereby are used, according to the invention, to change the quantity of material supplied to the mixing chamber through the various inlet openings.

It may be advantageous to dispose in the mixing chamber a drop pipe or collecting pipe whose inlet openings communicate with those of the mixing chamber via inlet chutes, having adjustable flow valves to regulate the quantity of each material flow. It is advantageous for the collecting tube, which is open at the bottom, to terminate a certain distance above the lower end of the material mixing chamber. A level regulator is maintained in the lower end of the mixing chamber to regulate the level of the material in the mixing chamber by influencing the silo discharging device.

To facilitate the discharge of material from the mixing chamber and the silo, a distributor cone can be provided at the outlet of the mixing chamber.

Brief description of the drawings

FIG. 1 is a sectional elevated view, partly in section, of the invention;
FIG. 2 is a top view of the invention;
FIG. 3 is a view of a modified form of the invention; and
FIG. 4 is a sectional view taken along lines 4—4 of FIG. 1.

Description of the preferred embodiments

The mixing device consists of a preferably cylindrical silo 1 having an air-activated conveyor 3 disposed on the bottom thereof. In the interior of the silo there is arranged a material mixing chamber 2 in the form of a hollow tube, circular in cross-section and substantially coextensive with the height of the silo 1. The mixing chamber 2 is open at the bottom. Compared to the silo diameter, the diameter of the mixing chamber 2 is relatively small, amounting in practice to about one-sixth to one-seventh of the silo diameter.

In the wall of the material mixing chamber, a plurality of inlet openings 4 are arranged at various levels. The number of openings correspond to the number of mixing phases "$n$" desired. Supports 5, inclined preferably at about 5° to 10°, extend radially from the openings 4 into the silo. Disposed on these supports 5 are open, air-activated conveyors 6 which may advantageously be provided with a cover 7 in the region adjacent the openings 4.

The material to be mixed is distributed throughout the silo chamber until it is completely filled by means of a suitable conveying device such as a closed air-activated gravity conveyor 8 (see particularly FIG. 2). Since charging takes place in a free overflow, the material, when the silo is full, flows towards an overflow vessel 9 which is supported on pressure gages or load cell devices 10, and serve primarily to control the overflow.

Mixing the material in the silo is accomplished by the material flowing along the conveyors 6, through openings 4, and into the mixing chamber 2. A constant material level is maintained by a suitable regulating device 14, such as an electronic level indicator, mounted in the lower portion of the mixing chamber 2. The regulating device 14 senses variations in the material level in the mixing chamber and transmits impulses to a metering valve 12 which is sensitive and regulated by the impulses.

This assures a constant material level in the mixing chamber 2 so that the same amount of material is continuously discharged from the mixing chamber as that amount of material which flows into the chamber 2 through openings 4.

To insure the entrance of the same amount of material into the mixing chamber through the openings 4, as that flowing into the silo 1, a second regulating means is provided which contains pressure gages or load cell devices 10. The second regulating means 10 senses variations in the amount of materials flowing into the overflow vessel 9 and transmits impulses, reflecting these variations, to a variable transmission 13, driven by an electric motor. The electric motor drives a rotary compressor 11 which regulates the amount of flowing and mixing air being supplied to the air-activated conveyor 6 for regulating the amount of material flowing into the mixing chamber 2 through openings 4.

If, for instance, the quantity of material supplied to the mixing device increases, this will first become noticeable by a rise in the level of material in the overflow vessel 9.

This increases the weight resting on the pressure gages or load cell devices 10. The pressure gages 10 now influence transmission 13 which alters the speed of the rotary compressor 11 so that the quantity of material flowing out of the openings 4 increases, thus adjusting itself to the greater supply. The metering valve 12, which is regulated by the level of material in the mixing chamber 2, insures what amount of material flowing into the mixing chamber 2 is actually discharged.

If the quantity of material supplied to the mixing device decreases, the level of material in the overflow vessel 9 drops. This reduces the weight on the pressure gages 10 and slows the speed of the compressor 11 down through transmission 13. The amount of material reaching the mixing chamber through openings 4 becomes smaller. Likewise, the metering valve 12 is so influenced by the level indicator 14 that the amount discharged from the silo is also reduced.

To facilitate the discharge of material from the mixing chamber 2 and the silo 1, i.e. to provide vortex formation and the like, a distributor cone 16 is provided which protrudes into the opening of the mixing chamber 2 and is located above the metering valve 12, as shown in FIGS. 1 and 3.

The equipment is also suited for coarse bulk material; however, a different conveyor 8 must be provided, such as a screw or belt conveyor. In place of the air-activated conveyors 3 and 6, disposed in the silo, mechanically conveying means may be provided. For instance, vibrating troughs whose amplitude or frequency is influenced by the controlled amount of overflow may be used instead of the air-activated gravity conveyors 3 and 6.

FIG. 3 shows a modification of a mixing device suitable for coarse bulk materials, such as grain. According to this modification, all openings 4 of the mixing chamber 2 are connected to lateral apertures 21, located in the walls of the collecting tube 17, via inclined chutes 20. Material regulating valves 18, located in each of the chutes 20, are automatically adjusted during the operation to regulate the individual amounts of material supplied to the collecting tube 17. The collecting tube 17 is connected at its lower end to a plate member 19 which is rigidly secured to the walls of the mixing chamber in the lower portion thereof. This plate 19 supports the level indicator 14 which is suspended therefrom.

Various changes may be made in the details of the invention as described, without sacrificing the advantages thereof or departing from the scope of the appended claims.

I claim:

1. A mixing apparatus for blending bulk material comprising an upright silo having a material outlet at the bottom thereof; a material inlet located in the upper portion of the silo communicating with a material source; a vertically disposed material mixing chamber located within the silo, said chamber communicating at its lower end with a material outlet and having a plurality of openings at various levels throughout its height; and means for regulating the discharge of blended material from the mixing chamber as a function of a predetermined material level to be maintained in the mixing chamber.

2. The mixing apparatus according to claim 1 wherein the discharge regulating means comprises a constant material level indicator mounted in the lower portion of the mixing chamber; and a discharge metering valve maintained in the material outlet, said level indicator communicating with the material valve for varying the rate of material discharged through the discharge outlet.

3. The mixing apparatus of claim 2 including a plurality of conveying means positioned within the silo and communicating with said openings.

4. The mixing apparatus of claim 3 having conveying means disposed along the bottom of said silo.

5. The mixing apparatus of claim 4 wherein the mixing chamber comprises a casing centrally located within the silo, extending from the top of the silo to a point immediately above the material outlet.

6. The mixing apparatus of claim 5 including a distributor cone located in the lower portion of the mixing chamber and mounted over the discharge outlet.

7. The mixing apparatus of claim 6 including an overflow vessel, said overflow vessel communicating with said material source for receiving material overflowing from the silo, said overflow vessel having means responsive to the variations in the amount of overflowing material for regulating the movement of the material along the conveying means.

8. The mixing apparatus of claim 7 wherein the conveying means is an air-activated gravity conveyor.

9. The mixing apparatus of claim 8 in which said responsive means comprises load cell devices supporting said overflow vessel, said load cell devices being connected to a compressor through a motor driven variable transmission, said compressor delivering compressed air to the air-activated gravity conveyors.

10. The mixing apparatus according to claim 1 wherein a collecting tube is vertically disposed within the mixing chamber and coextensive therewith, said collecting tube having a plurality of lateral apertures, each aperture communicating, via upwardly inclined supply chutes, with a respective opening in the mixing chamber.

11. The mixing apparatus according to claim 10 wherein each of said chutes carries an adjustable flow valve.

12. The mixing apparatus of claim 11 including an overflow vessel, said overflow vessel communicating with said material source for receiving material overflowing from the silo, said overflow vessel having means responsive to the variations in the amount of overflow material for regulating the adjustable flow valve.

13. A mixing apparatus for blending bulk material comprising an upright silo having a material outlet at the bottom thereof; a material inlet located in the upper portion of the silo communicating with a material source; a vertically disposed material mixing chamber located within the silo, said chamber comprising a casing centrally located within the silo and extending from the top of the silo to a point near the bottom thereof and having a plurality of openings at various levels throughout its height; means for regulating the discharge of blended material from the mixing chamber as a function of a predetermined material level to be maintained in the mixing chamber comprising a constant material level indicator mounted in the lower portion of the mixing chamber and a discharge metering valve mounted in the material outlet, said level indicator communicating with said metering valve for varying the rate of material discharged through the discharge outlet; air-activated gravity conveyors positioned within the silo and communicating with the openings and positioned along the bottom of the silo;

a distributor cone located in the lower portion of the mixing chamber and mounted over the discharge outlet; and an overflow vessel communicating with said material source for receiving material overflowing from said silo, said overflow vessel having load cell devices supporting said vessel which are connected to a compressor through a motor driven variable transmission, said compressor delivering compressed air to the air-activated gravity conveyors.

References Cited
UNITED STATES PATENTS

| | | | |
|---|---|---|---|
| 1,513,975 | 11/1924 | Eichelberger | 259—4 |
| 3,041,049 | 6/1962 | Tomiji | 259—154 X |
| 3,216,629 | 11/1965 | Goins | 259—180 X |
| 3,336,006 | 8/1967 | Berg | 259—2 |

ROBERT W. JENKINS, *Primary Examiner.*